US010048928B2

(12) United States Patent
Heiniger et al.

(10) Patent No.: US 10,048,928 B2
(45) Date of Patent: Aug. 14, 2018

(54) MIXING CONSOLE WITH MOVABLE DISPLAY

(71) Applicant: Studer Professional Audio GmbH, Regensdorf (CH)

(72) Inventors: Roger Heiniger, Oberdurnten (CH); Robert Huber, Schlieren (CH)

(73) Assignee: Studer Professional Audio GmbH, Regensdorf (CH)

( * ) Notice: Subject to any disclaimer, the term of this patent is extended or adjusted under 35 U.S.C. 154(b) by 0 days.

(21) Appl. No.: 14/513,795

(22) Filed: Oct. 14, 2014

(65) Prior Publication Data
US 2015/0103026 A1 Apr. 16, 2015

(30) Foreign Application Priority Data
Oct. 15, 2013 (EP) ..................................... 13188713

(51) Int. Cl.
| G06F 3/16 | (2006.01) |
| G06F 3/0484 | (2013.01) |
| G06F 3/0488 | (2013.01) |
| H04H 60/04 | (2008.01) |

(52) U.S. Cl.
CPC .......... G06F 3/165 (2013.01); G06F 3/04847 (2013.01); G06F 3/04886 (2013.01); H04H 60/04 (2013.01)

(58) Field of Classification Search
None
See application file for complete search history.

(56) References Cited

U.S. PATENT DOCUMENTS

| 2011/0130200 A1* | 6/2011 | Terada et al. .................... 463/31 |
| 2012/0023406 A1* | 1/2012 | Fujita ..................... H04H 60/04 715/727 |
| 2014/0281984 A1* | 9/2014 | Milne et al. .................. 715/716 |

FOREIGN PATENT DOCUMENTS

| EP | 1630989 A2 | 3/2006 |
| EP | 2341421 A2 | 7/2011 |

OTHER PUBLICATIONS

European Patent Office, Extended European Search Report of 13188713.5, Netherlands, dated Mar. 4, 2014, 6 pages.

* cited by examiner

Primary Examiner — David D Davis
(74) Attorney, Agent, or Firm — McCoy Russell LLP

(57) ABSTRACT

The invention relates to a mixing console which comprises an input unit configured to receive at least one audio signal channel; a first display configured to display audio signal channel related information; a plurality of control elements configured to control at least one signal characteristic of the at least one audio signal channel, wherein the first display and the plurality of control elements are located on a first surface area of the mixing console. The mixing console furthermore comprises at least one connecting element provided on the first surface area; a touch-sensitive display comprising at least one support element which interacts with the at least one connecting element to removably connect the touch-sensitive display to the first surface area, wherein the at least one connecting element is located on the first surface area in such a way that the touch-sensitive display covers a part of the first surface area when it is connected to the first surface area.

18 Claims, 4 Drawing Sheets

MIXING CONSOLE WITH MOVABLE DISPLAY

CROSS REFERENCE TO RELATED APPLICATIONS

The present application claims priority to European Patent Application No. 13188713, entitled "Mixing Console with Movable Display," and filed on Oct. 15, 2013, the entire contents of which are hereby incorporated by reference for all purposes.

TECHNICAL FIELD

Various embodiments relate to a mixing console for applications such as multi-track recording, broadcast, post-production, live sound reinforcement, and stage monitoring, and to a movable, touch-sensitive display.

BACKGROUND

A mixing console, the heart of a sound system, receives a plurality of audio signal channels form different audio sources, e.g. from microphones, electronic musical instruments, tape recorders, or CD players. The mixing console amplifies these sources and allows the operator of the console to mix them, equalize them, and add effects according to the requirement of the installation. The complexity and the growing functionality in modern mixing consoles, mostly digital mixing consoles, generates a need for more screen units or handling units on the same mixer surface which is accessible by the operator of the console.

Typically, at least one large central display unit is present where the central mixing console functions are displayed and can be manipulated. The central mixing console functions normally do not relate to functions of a single audio signal channel or bus, but relate to the operating mode of the console. By way of example, a patching view may be provided which indicates which input channel is transmitted to which output channel.

A mixing console comprises, for each of the different channels, operating elements such as faders and rotary knobs to adapt the signal characteristic of the audio signal. Mixing consoles furthermore often comprise channel related displays or handling units which are normally placed on top of the faders. This part allows the channel parameters like the equalizers to be controlled and manipulated. Furthermore, level meter screens are provided on the same surface area, e.g. on an upper part of the surface area which may or may not be accessible by the operator.

If the whole available space around the operating elements is used by the channel screens and the upper surface space is used for the level meter screens, there is no free space where the central display can be placed. The overall height of the upper surface of the whole system is limited because, for most of the applications, a sitting operator should be able to look over the console to monitor the event where the audio signals are generated.

A possible solution is to put this display on top of the mixing console or on one side of the mixing console. However, both solutions reduce the field of vision of the operator and the stereo acoustics are degraded. Furthermore, in both solutions it is not possible to use a touchscreen display because the distance between the operator and the display is too long.

Accordingly, a need exists to provide a mixing console which overcomes at least some of the above-mentioned problems and which does not degrade the field of vision for the operator.

SUMMARY

This need is met by the features of the independent claim. Further embodiments are described in the dependent claims.

According to a first aspect a mixing console is provided comprising an input unit configured to receive at least one audio signal channel. The mixing console furthermore comprises a first display configured to display audio signal channel related information. Furthermore, a plurality of control elements configured to control at least one signal characteristic of the at least one audio signal channel are provided. The first display and the plurality of control elements are located on a first surface area of the mixing console. The mixing console furthermore comprises at least one connecting element provided on the first surface area and a touch-sensitive display comprising at least one support element which interacts with the at least one connecting element to removably connect the touch-sensitive display to the first surface area. The at least one connecting element is located on the first surface area in such a way that the touch-sensitive display covers a part of the first surface area when it is connected to the first surface area.

The first surface area is the mixer surface where control elements and the first display displaying general information are provided. It is the surface area an operator can reach when using the mixing console to control the audio signal channels. In the present embodiment the touch-sensitive display is removably connected to the first surface area and the touch-sensitive display covers at least a part of the first surface area in its connected state. The above described mixing console has the advantage that an additional screen or display need not be placed on top of the mixing console so that the field of view of the operator is not degraded. Furthermore, by providing the touch-sensitive display removably on the first surface area, the touch-sensitive display comes closer to the operator and can thus be made touch-sensitive. The operator can use the touch-sensitive display to control a certain function of the mixing console.

The touch-sensitive display can display different kinds of information. In a first embodiment the information displayed on the touch-sensitive display is information relating to the central mixing console functions, such as the patching view or any other information that is not only related to a single audio function.

In another embodiment, however, the information displayed by the touch-sensitive display can relate to one or several of the audio signal channels.

It is possible that the touch-sensitive display may be arranged slidably on the first surface area. By way of example, the at least one connecting element provided on the first surface area may be configured to allow a movement of the touch-sensitive display parallel to the first surface area. By way of example, the connecting elements may be designed as rails provided on the first surface area and which allow one of a horizontal or a vertical movement of the touch-sensitive display on the first surface area. The support element or support elements of the touch-sensitive display may comprise sliding elements which allow the touch-sensitive display to slide on the provided rails. By way of example, the support element may comprise wheels which are guided in the rails of the first surface area and allow a movement parallel to the first surface area.

In the present mixing console the surface area may be divided into different parts, wherein different parts of the mixing console, and thus different parts of the first surface area, are provided for different audio signal channels. The at least one connecting element may now be configured in such a way that the touch-sensitive display can be provided in different snap-in positions on the mixing console, e.g. in order to display position-related information. The at least one connecting element may be configured to provide different snap-in positions for the touch-sensitive display, wherein in each snap-in position the touch-sensitive display covers a different part of the first surface area.

The mixing console can furthermore comprise an information generating unit which is configured to generate the information to be displayed on the touch-sensitive display. As mentioned above, the information generating unit may generate information relating to the operating status of the mixing console as a whole or may generate other signal channel related information.

The information generating unit can be configured to generate a position dependent information to be displayed on the touch-sensitive display. The information generating unit then generates the information to be displayed in dependence on the snap-in position in which the touch-sensitive display is located. A position detecting unit may be provided which determines the position of the touch-sensitive display on the first surface area, e.g. by detecting in which snap-in position the touch-sensitive display is located and, in dependence on the determined location, the information generating unit can generate a kind of information that is related to the position in which the touch-sensitive display is located on the first surface area.

The mixing console can, for the different audio signal channels, comprise different parts of the first surface area where the control elements or first display is located which are used to control signal characteristics of the corresponding channel. The information generating unit may be able to determine in which part of the first surface area the touch-sensitive display is connected to the first surface area and which at least one audio signal channel is controlled in the determined part of the first surface area. The information generating unit which generates the information to be displayed by the touch-sensitive display can then generate the information to be displayed in dependence on the determined at least one audio signal channel.

In such an embodiment it may be possible to move the touch-sensitive display over the first surface area to display and manipulate audio functions which are controlled on the different parts of the surface where the touch-sensitive display is connected to the first surface area.

The mixing console may furthermore comprise a power providing module configured for a wireless transmission of power to the touch-sensitive display. The touch-sensitive display may comprise a power receiving unit configured to receive the wirelessly transmitted power and configured to provide the power to the touch-sensitive display. By way of example, the power receiving unit may be configured to receive the wirelessly transmitted power by inductive coupling. The power providing unit may be incorporated into the mixing console and the touch-sensitive display may not necessarily comprise a separate power providing module.

In another embodiment the removable touch-sensitive display may also comprise its own power supply which can be charged when the display is connected to the first surface. In this embodiment it may be possible to remove the touch-sensitive display from the first surface area. The information generating unit can transmit the information to be displayed to the touch-sensitive display using any wireless transmission technology such as Bluetooth, WLAN, etc. When the touch-sensitive display is removed from the first surface area the displayed information may either remain unchanged, i.e. if channel related information is displayed on the touch-sensitive display the channel related information may remain displayed on the display so that the operator can configure and control the audio signal the parameters of which are shown on the touch-sensitive display. In this embodiment the touch-sensitive display operates as a kind of remote control for one or several channels of the audio signal.

In another embodiment the touch-sensitive display can display the information relating to the mixing console and its operating status as a whole. When the touch-sensitive display is removed from the first surface area, the operator of the mixing console can nevertheless monitor and control the displayed functions on the touch-sensitive display. In the unconnected state the information generating unit can continue to transmit the information to be displayed to the touch-sensitive display so that the operator can continuously monitor the desired functions or parameters of the audio signal.

The touch-sensitive display has a certain size and with its size it covers a part of the first surface area. In one embodiment the touch-sensitive display covers a first surface area where either a first display displaying audio signal channel related information or where control elements are provided when it is connected to the first surface area. In another embodiment the touch-sensitive display may be provided on a part of the first surface area where no display elements or control elements are provided. By way of example, the touch-sensitive display may replace a plurality of first displays which display audio channel related information. By moving the touch-sensitive display to different positions on the first surface area, audio signal channel related information which is controlled on the corresponding surface area may be displayed on the touch-sensitive display. In this embodiment the touch-sensitive display would replace several of the first displays with display channel related information. By moving the touch-sensitive display over the first surface area channel related information can be displayed for different channels.

The invention furthermore relates to a touch-sensitive display configured to display the signal characteristic of the at least one audio signal channel input into the mixing console. The display comprises at least one support element configured to interact with a connecting element provided on an operating surface area of the mixing console in order to removably connect the touch-sensitive display to the operating surface area of the mixing console. Furthermore, a power receiving unit is provided configured for a wireless reception of power used to operate the touch-sensitive display. A communication interface of the touch-sensitive display is configured for a wireless reception of display information generated by the audio mixing console and which is to be displayed on the touch-sensitive display, the display information comprising the signal characteristic of the at least one audio signal channel. A display generating module of the touch-sensitive display is configured to generate the received display information.

Preferably, the support element allows a support of the touch-sensitive display on the mixing console and allows a movement of the touch-sensitive display parallel to the operating surface area of the mixing console.

Furthermore, the communication interface can be a bidirectional interface configured to receive display information from the mixing console and configured to send touch-related information to the mixing console. When a user touches the screen of the touch-sensitive display in order to generate a command, this touch-related information, e.g. the pressing of a button shown on the display, is transmitted as touch-related information to the mixing console.

The power receiving unit and the communication interface may be incorporated into a single wireless module where radio frequency waves of the mixing console can be received, e.g. using solenoids, the radio frequency waves being used to power the touch-sensitive display. The received radio frequency waves can also contain the display information to be displayed.

The support element can be a wheel or rail provided on the touch-sensitive display, or a larger number of wheels, e.g. two to four wheels or one or two rails provided on the lower surface of the touch-sensitive display which interact with a corresponding connecting element provided on the operating surface area of the mixing console. The operating surface area can correspond to the first surface area of the mixing console mentioned above.

It should be understood that the features mentioned above and features yet to be explained below can be used not only in the respective indicated context, but also in other combinations or in isolation without departing from the scope of the invention. Features of the above-mentioned aspects and embodiments may be combined with each other in other embodiments. A more particular description of the invention briefly discussed above will be rendered by reference to specific embodiments thereof that are illustrated in the appended drawings.

DETAILED DESCRIPTION

Figure 1:
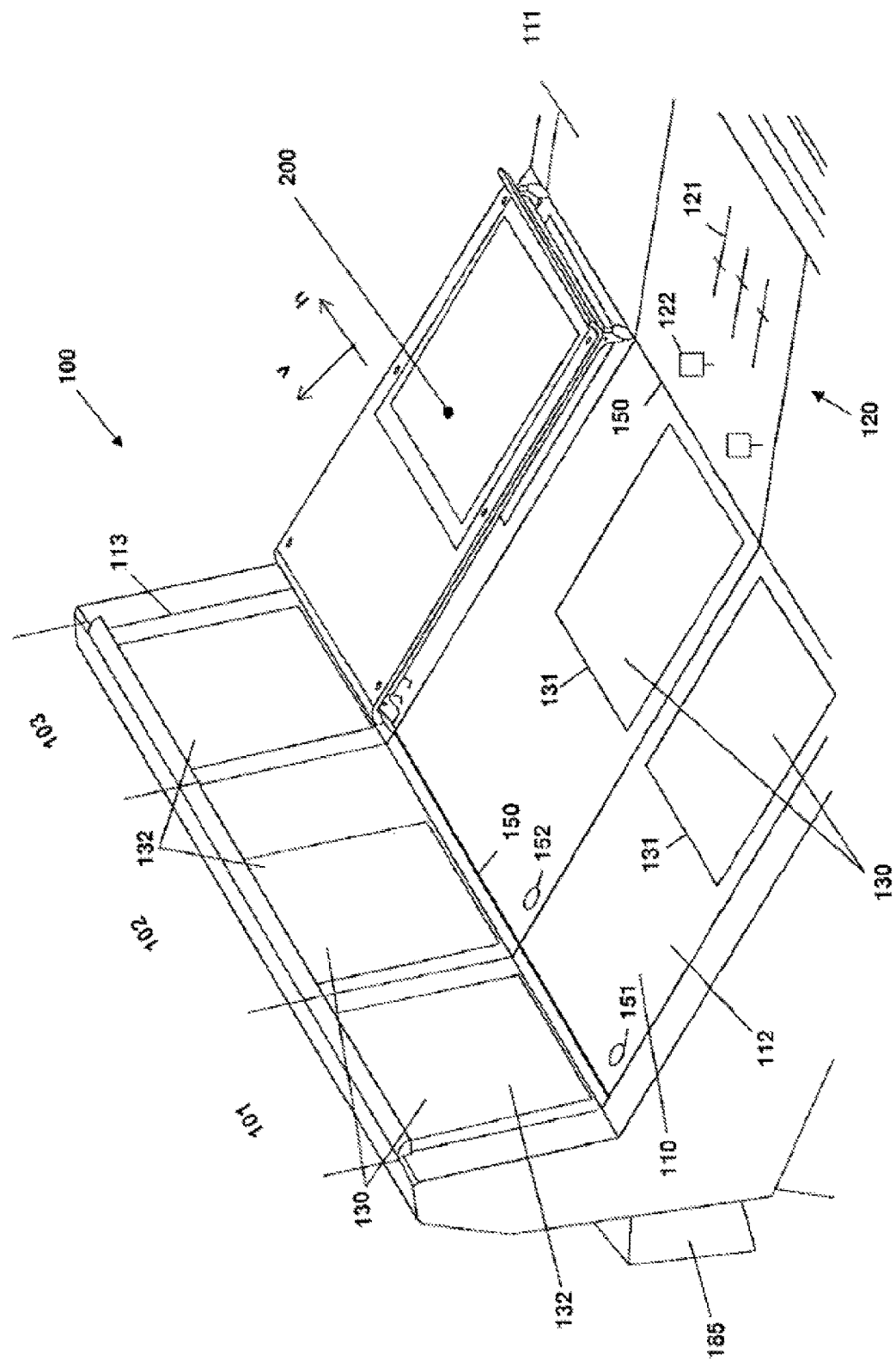
FIG. 1 is a schematic illustration of a mixing console comprising a removable touch-sensitive display.

In the following, embodiments of the invention will be described in detail with reference to the accompanying drawings. It is to be understood that the following description embodiments is not to taken in a limiting sense.

The drawings are to be regarded as being schematic representations and elements illustrated in the drawings are not necessarily shown to scale. Rather, the various elements are represented such that their function and general purpose become apparent to a skilled person. Any connection or coupling between different modules or blocks, devices and components and other physical or functional units shown in the drawings or described herein may also be implemented by an indirect connection or coupling.

Furthermore, the functional blocks shown in the drawings may be implemented by hardware, software or by combination of hardware and software.

In FIG. 1 a mixing console 100 is schematically shown. The mixing console 100 can be a digital mixing console. The mixing console receives different audio signal channels from different sources such as a microphone or electronic musical instruments or other digital audio sources. The mixing console amplifies the input signals and allows the operator to mix them, equalize them or add effects according to the requirements. The mixing console furthermore comprises mix buses where the different input channels may be mixed.

The mixing console comprises a first surface area 110 where the different control elements 120 such as faders or rotary knobs are located. Furthermore, a plurality of first displays 130 are provided on the first surface. These display units display audio signal channel related information and may comprise e.g. a channel screen 131, where signal characteristics or audio parameters of audio signal channels may be displayed. The channel screen can contain encoders and can be touch-sensitive to manipulate the audio signal. Furthermore, different meter screens 132 may be provided as first displays which may display meter information, e.g. LED bar graph meters. The displays 131 and 132 and the control elements 120 such as faders 121 or rotary knobs 122 are provided on the first surface area 110. In the embodiment shown in FIG. 1 the first surface area 110 is not a planar surface, but comprises different sections with different inclination levels. By way of example, the first surface area may comprise a first part 111 of the surface area 110 which has a first defined inclination relative to the user followed by a second part 112 of the surface area which is further inclined to provide a better view for the operator. In the embodiment shown in FIG. 1 a third part 113 of the first surface area is provided where different displays are locate which inform the operator of certain characteristics of the audio signal channels. In the embodiment shown in FIG. 1 the different parts 111, 112, and 113 have different orientations relative to the operator. However, it should be understood that the first surface area comprising parts 111, 112, and 113 may also be a plane surface so that the different parts 111, 112, and 113 are parallel to each other. The inclination of the different parts relative to each other mainly depends on the size of the mixing console. The larger the mixing console is, the more the number of surface inclinations increases in order for the operator to overview the different pieces of information provided in the different parts of the first surface area. Furthermore, an audio input/output interface 185 is schematically shown where the different audio signal input channels are received and where the master channels are output.

Figure 3:
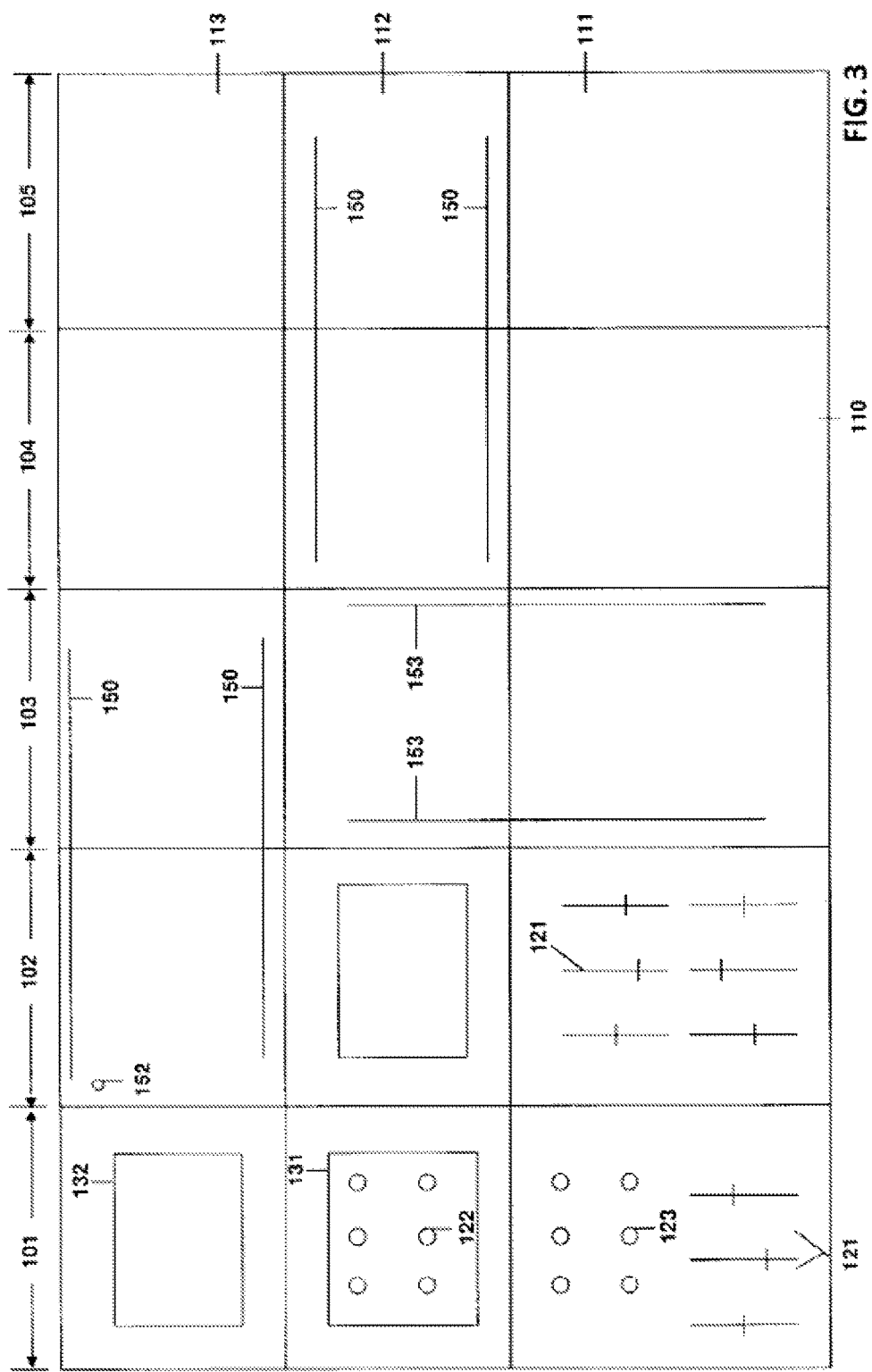
FIG. 3 is a schematic top view of a first surface area of the mixing console where the displays and control elements are located that are used to control the audio signals.

The different parts of the first surface area are also shown in FIG. 3 in a top view. In the embodiment of FIG. 3 the arrangement of the rotary knobs is slightly amended as the rotary knobs are provided as part of a display 131 such as a channel screen which is a touch-sensitive display on which rotary actuating elements 122 are provided and with which different characteristics of the audio signal can be adjusted.

In addition to the first surface area, which is the user interface, the mixing console comprises a core part provided for audio processing and an audio input/output interface 185. The core part (not shown in the figures) and the audio interface 185 are not explained in detail as these parts correspond to parts used in current mixing consoles.

In the embodiment of FIG. 1 a touch-sensitive display 200 is shown which is connected to the first surface area 110 of the mixing console 100. The touch-sensitive display can be configured as a removable display and provides a further Man Machine Interface of the mixing console 100. In the following reference is also made to FIG. 2 where the touch-sensitive display 200 is shown in a schematic side view. The touch-sensitive display can comprise support elements 210 such as wheels which are guided in a connecting structure of the first surface area. The connecting structure or connecting element provided on the first surface area may be designed as rails 150 which are provided on the first surface area and in which the wheels 210 can move. In the embodiment shown in FIG. 1 the touch-sensitive display can move along the horizontal direction as indicated by arrow h shown in FIG. 1. However, it should be understood that the connecting elements provided on the first surface area may also be arranged such that a movement in the other direction v, perpendicular to the horizontal movement, is possible. In this embodiment the touch-sensitive display would be movable parallel to the arrow v shown in FIG. 1. For the mixing console shown in FIG. 1 this would mean that the touch-sensitive display may change its orientation so that in one location the touch-sensitive display would cover display 132, whereas in the embodiment shown it actually covers display 131. The touch-sensitive display can have different parts, e.g. may be divided into different touch-sensitive zones. A first part may display the patch situation for general overview and locating, whereas a second display part shows a zoomed content that can be changed by directly touching in the patch matrix. Furthermore, the display can contain an additional large rotary encoder that is assigned to a touch selected box on the display and allows precise parameter change. If the display is removed for remote operation, then the parameters can be changed by sliding on the screen. In this embodiment a physical encoder is mounted on the moveable part that is attached to the mixing console.

Figure 2:
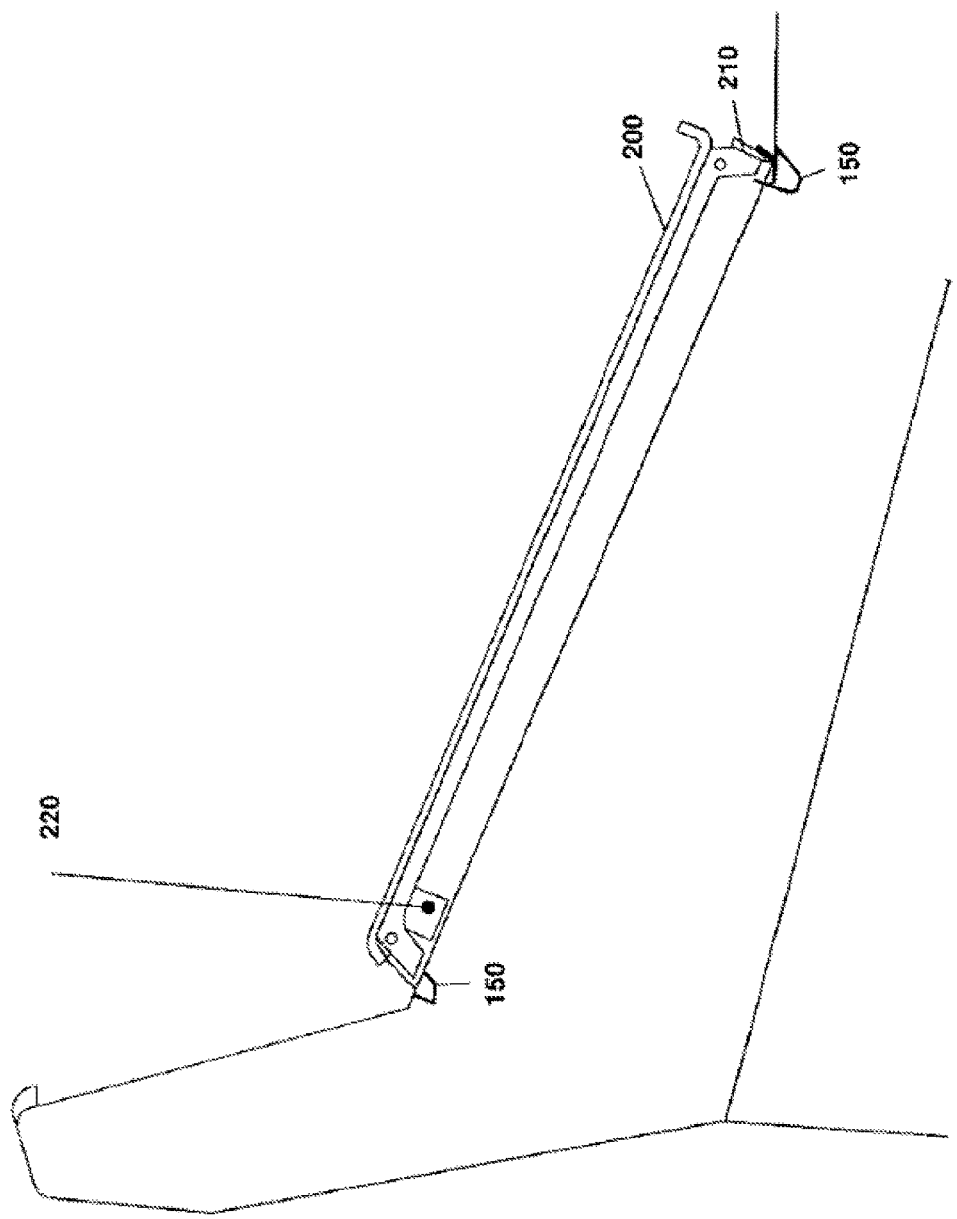
FIG. 2 is a side view of the mixing console of FIG. 1 and specifies in further detail how the touch-sensitive display is connected to the mixing console.

As shown in FIG. 2, the touch-sensitive display comprises a power receiving unit 220 via which power needed to run the touch-sensitive display 200 is fed to the display. As will be explained later in connection with FIG. 4, the mixing console comprises a power providing module which provides the power to be transmitted to the power receiving unit 220. The power receiving unit may comprise one or more solenoids for an adaptive coupling of power provided by the power providing module installed in the mixing console body. The power receiving unit 220 may also be used as a communication interface configured to receive the information needed to generate information to be displayed on the touch-sensitive display. The communication interface can also be a separate module. As will be explained further in detail below in connection with FIG. 4, the mixing console comprises an information generating unit which will generate the information to be displayed by the touch-sensitive display 200, e.g. on a screen of the display. This kind of information is generated within the mixing console and then transmitted to the touch-sensitive display using a wireless communication connection.

In the embodiment shown wheels are used to move the touch-sensitive display on the first surface area. However, it should be understood that other elements or mechanisms may be used to move the touch-sensitive display on the first surface area or to connect the display to different parts of the first surface area.

Referring again to FIG. 1, the mixing console 100 may comprise different bays or blocks 101, 102, and 103. The number of bays or blocks differs from the size of the mixing console, in the embodiment of FIG. 1 schematically three different bays are shown, whereas in FIG. 3 five bays are shown (101, 102, 103, 104, and 105). The mixing console receives a plurality of different audio channels. Each bay or block may comprise the displays and control elements needed to control a certain number of channels, by way of example, bay 101 may comprise the control elements and displays needed to control the first four signal channels, whereas the second bay 102 comprises the control elements and display needed to control signal channels 5-8 etc. This means that different parts of the first surface area are provided to control different audio signal channels. Furthermore, a bay, e.g. bay 105 shown in FIG. 3 or bay 103 in FIG. 1, can be provided as master bay where the master channels or buses corresponding to the audio signal outputs are controlled.

The touch-sensitive display and the mixing console may now be configured in such a way that the information displayed by the touch-sensitive display depends on the position on the first surface area in which the touch-sensitive display is located. The connecting elements 150 which are used to guide the movement of the touch-sensitive display on the first surface area can have different snap-in positions such as snap-in position 151, 152 shown in FIG. 1.

As discussed above, the different parts of the first surface area are provided to control different audio signal channels. When the touch-sensitive display is moved to a snap-in position such as snap-in position 151, the mixing console can be designed in such a way that the touch-sensitive display displays information relating to the audio signal channel or audio signal channels which are controlled in the part of the first surface area where the touch-sensitive display is located. Referring back to the example given above, if channels 1-4 are controlled in the first bay and if the touch-sensitive display is moved to a position where the touch-sensitive display snaps into snap-in position 151, the touch-sensitive display may display information relating to these channels 1-4 or to one of these channels. If the touch-sensitive display is moved to snap-in position 152, the touch-sensitive display may display information relating to the audio signal channels controlled in the corresponding part of the mixing console, in the example above channels 5-8.

Generally, the touch-sensitive display may display channel related information as mentioned above or may display information relating to the operating status of the mixing console as a whole, e.g. it may show the patching view of the different channels or may show other functions which relate to the mixing console as a whole and not to a single channel.

In addition, the information generated to be displayed on the touch-sensitive display may only inform the user of a certain audio signal parameter. However, the touch-sensitive display may also display buttons or control elements with which an operator can actively control the mixing or a parameter or characteristic of an audio signal by touching the surface. It should be understood that the touch-sensitive display may also be a multi-touch display configured to identify and locate multiple touches or near touches to its surface.

In the embodiment shown in FIG. 3 the first surface is shown in further detail. The different parts 111, 112, 113 of the surface may all be parallel or may be inclined as shown in FIG. 1. In the embodiment shown in FIG. 1 the connecting element 150 designed as two rails are arranged in such a way that a horizontal movement on the first surface area is possible. A movement perpendicular to the horizontal movement may also be possible as shown in FIG. 3 by the two vertically arranged rails 153. The rails may furthermore comprise snap-in positions in the vertical direction which are, however, not detailed in FIG. 3. The support element on the display may also be a rail cooperating with a corresponding mechanism on the first surface. In this embodiment only one part of the touch-sensitive display is connected to the surface, the other part of the display is floating in the air above the surface. In a preferred embodiment the faders, such as faders 121, are not covered by the moveable touch-sensitive display as the operator may always need access to these faders to control the audio signals. However, it should be understood that in another embodiment the connecting elements provided on the first surface area may be arranged such that the touch-sensitive display may be moved to the complete area covered by the first surface area.

In the embodiment shown in FIG. 3 rotary knobs 122 may be provided on a touch-sensitive display 131, which in this embodiment is touch-sensitive. To symbolize different arrangements of actuating elements, bay 101 shows in the part 111 faders 121 and rotary knobs 123, whereas in bay 102, part 111 of the first surface only contains faders 121.

Figure 4:
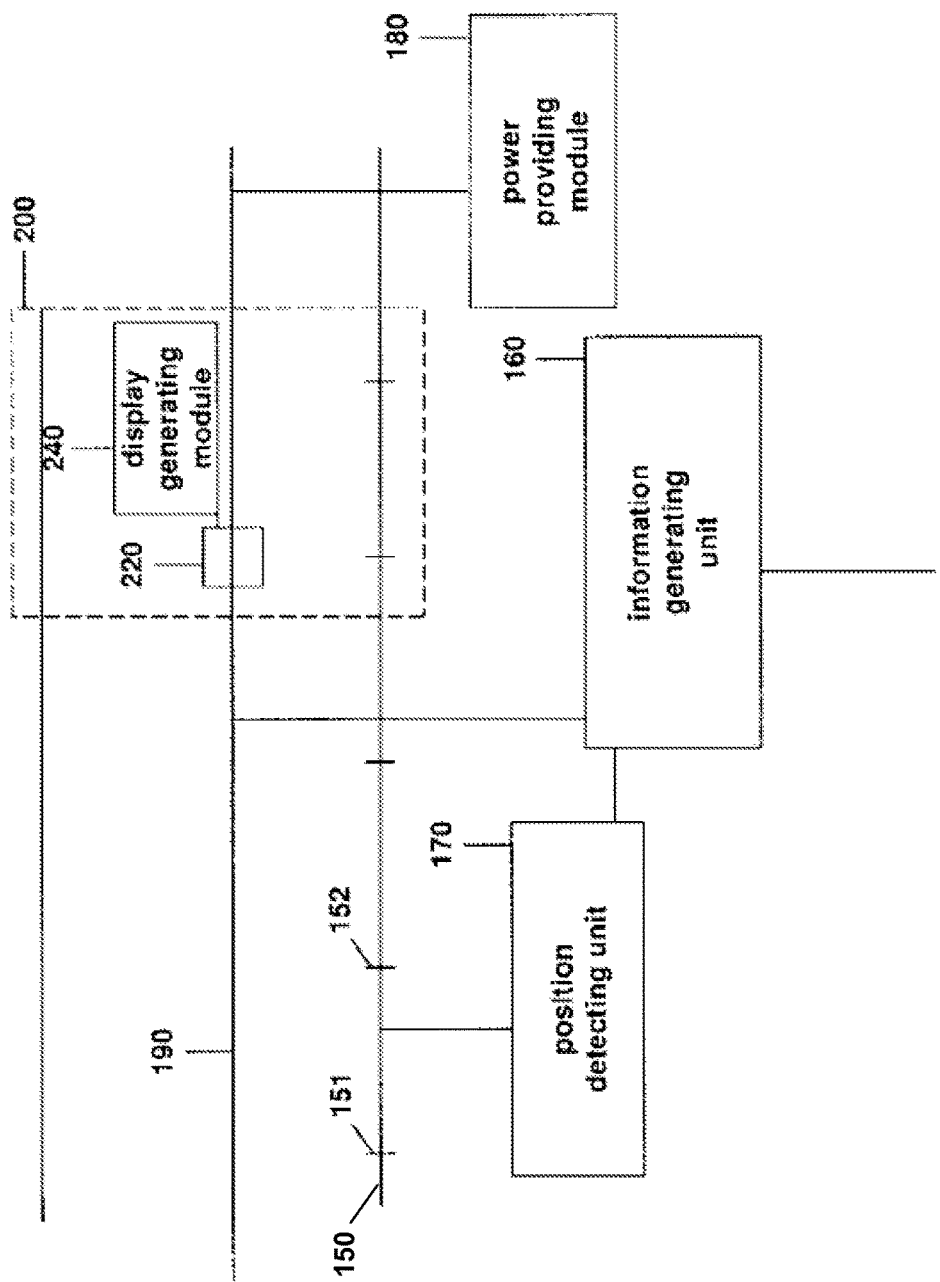
FIG. 4 shows a schematic view of part of the mixing console where the information to be displayed on the touch-sensitive display is generated.

In connection with FIG. 4, the different components needed to generate the information displayed on the touch-sensitive displays are discussed in more detail. The touch-sensitive display 200 comprises a display generating module 240 and the power receiving unit 220 where the power needed to operate the touch-sensitive display 200 is received. The power receiving unit may also be used as a communication interface where the information to be displayed on the screen of the touch-sensitive display is received. The information to be displayed on a screen (not shown) of the touch-sensitive display is generated by the information generating unit 160 which may be incorporated into the housing of the mixing console. The display generating unit 240 detects in the signal received from the mixing console a display information which should be shown on the screen of the display 200. The display information is extracted from the signal and processed in such a way that display information can be presented to the operator of the console on the screen (not shown) of the display 200. It should be understood that the communication is bidirectional as inter alia the commands generated by the touch-sensitive surface are transmitted to the mixing console, e.g. the audio processing part. A position detecting unit 170 detects the position of the touch-sensitive display 200 on the first surface area, e.g. by detecting in which of the snap-in positions 151 or 152 the touch-sensitive display is located. The position detecting unit may be based on optical elements where a light beam is used to determine the position of the touch-sensitive display. Magnetic induction may be used to determine the position or a satellite based positioning may be used, e.g. by a GPS receiver provided in the touch-sensitive display. Furthermore, video signals may be used and processed to determine the position of the touch-sensitive display 200 on the first surface area.

The power provided to the touch-sensitive display 200 is provided by a power providing module 180. In the embodiment shown the power is provided to a support line 190 from where the power and information to be displayed is transmitted to the touch-sensitive display using wireless transmission technologies, e.g. RF-fields.

The touch-sensitive display may also comprise its own power supply (not shown). In this embodiment the touch-sensitive display 200 may be moved away from the connecting elements 150 and may nevertheless be used to monitor or control the mixing console. The information to be displayed may be transmitted to the touch-sensitive display using WIFI or Bluetooth.

The touch-sensitive display 200 covers a certain area of the first surface area. The mixing console may be designed such that, when the touch-sensitive display is connected to the mixing console, either display unit 131 or 132 or the control elements such as control elements 121 and 122 are covered by the touch-sensitive display so that the covered display elements or control elements are not accessible by the operator. However, as the touch-sensitive display can be moved around on the first surface area, the operator may move the touch-sensitive display to another position if the operating elements located in the area covered by the touch-sensitive display or the display covered by the touch-sensitive display need to be accessed by the operator. In another embodiment the touch-sensitive display may replace different first displays provided in the console, i.e. may replace different displays which display audio signal channel related information, e.g. displays 132 shown in FIGS. 1 and 3. In this embodiment a single moveable touch-sensitive display would be provided which moves in a horizontal direction to the different positions where the displays such as display 132 would be provided. By moving the touch-sensitive display from one bay to the next bay the corresponding signal parameters of the different audio signal channels could be displayed one after the other. By way of example, if a touch-sensitive display is moved to bay 101 the signal parameters of audio signal channels controlled by bay 101 would be displayed, and if the touch-sensitive display is moved to bay 102 the touch-sensitive display would display parameters relating to the audio signal channels controlled by bay 102. In this embodiment the different fixedly installed displays 132 could be omitted.

The invention claimed is:

1. A mixing console comprising:
an input unit configured to receive at least one audio signal channel;
a first display configured to display audio signal channel related information;
a plurality of control elements configured to control at least one signal characteristic of the at least one audio signal channel, wherein the first display and the plurality of control elements are located on a first surface area of the mixing console;
at least one connecting element provided on the first surface area;
a touch-sensitive display comprising at least one support element which interacts with the at least one connecting element to removably connect the touch-sensitive display to the first surface area in each of a plurality of positions, wherein the at least one connecting element is located on the first surface area in such a way that the touch-sensitive display covers a part of the first surface area when it is connected to the first surface area and is disposed on a plane parallel to and above the first surface area, wherein in each position of the plurality of positions the touch-sensitive display covers a different part of the first surface area, and wherein the touch-sensitive display is different from the first display; and
an information generating unit configured to generate position-dependent information to be displayed on the touch-sensitive display, wherein the information generating unit generates the information to be displayed in dependence on the position in which the touch-sensitive display is located.

2. The mixing console according to claim 1, further comprising a power providing module configured for a wireless transmission of power to the touch-sensitive display, the touch-sensitive display comprising a power receiving unit configured to receive the wirelessly transmitted power and configured to provide power to the touch-sensitive display.

3. The mixing console according to claim 2, wherein the power receiving unit is configured to receive the wirelessly transmitted power by inductive coupling.

4. The mixing console according to claim 1, wherein the at least one connecting element and the at least one support element are configured to allow a movement of the touch-sensitive display parallel to the first surface area.

5. The mixing console according to claim 1, wherein the at least one connecting element is configured to provide different snap in positions for the touch-sensitive display, wherein each of the plurality of positions comprises a different one of the snap in positions.

6. The mixing console according to claim 5, wherein the input unit is configured to receive different audio signal channels, wherein the mixing console comprises, for each audio channel, a part on the first surface area in which control elements are located to control the signal characteristics of the corresponding channel, wherein the information generating unit is configured to determine in which part of the first surface area the touch-sensitive display is connected to the first surface area and which at least one audio signal channel is controlled in the determined part of the first surface area, wherein the information generating unit is configured to generate the information to be displayed on the touch-sensitive display in dependence on the determined at least one audio signal channel.

7. The mixing console according to claim 6, wherein the different snap in positions are provided for the different parts of the first surface area.

8. The mixing console according to claim 7, wherein the at least one connecting element comprises rails allowing at least one of a horizontal movement and a vertical movement of the touch-sensitive display on the first surface area.

9. The mixing console according to claim 1, wherein the at least one support element comprises at least one wheel moving in at least one rail provided as the at least one connecting element.

10. The mixing console according to claim 1, wherein the information generating unit is configured to generate information relating to an operating status of the mixing console as a whole and not relating to a single audio signal channel.

11. The mixing console according to claim 1, wherein the touch-sensitive display comprises a power supply incorporated into the touch-sensitive display.

12. The mixing console according to claim 1, wherein the touch-sensitive display covers at least one of the first display and some of the plurality of control elements when it is connected to the first surface area.

13. A touch-sensitive display configured to display a signal characteristic of at least one audio signal channel input into a mixing console, the display comprising:
at least one support element configured to interact with a connecting element provided on an operating surface area of the mixing console in order to removably connect the touch-sensitive display to the operating surface area of the mixing console, the touch-sensitive display being disposed on a plane parallel to and above the operating surface area when connected to the operating surface area via the connecting element, the touch-sensitive display covering one or more selected elements disposed on the operating surface area of the mixing console, each of the selected elements including one or more of an additional display and a control element, and each of the selected elements usable to control or display characteristics of a selected audio signal channel;
a power receiving unit configured for a wireless reception of power used to operate the touch-sensitive display;
a communication interface configured for a wireless reception of display information generated by the mixing console and which is to be displayed on the touch-sensitive display, the display information comprising a signal characteristic of the selected audio signal channel associated with the one or more selected elements that are covered by the touch-sensitive display; and
a display generating module configured to display the received display information on a screen of the touch-sensitive display.

14. The touch-sensitive display according to claim 13, wherein the at least one support element is designed to allow a support of the touch-sensitive display on the mixing console and to allow a movement of the touch-sensitive display parallel to the operating surface area of the mixing console to a plurality of positions, where, in each of the plurality of positions, the touch-sensitive display receives display information comprising a respective signal characteristic of a respective audio signal channel associated with control or display elements that are covered by the touch-sensitive display in that position.

15. The touch-sensitive display according to claim 13, wherein the communication interface is a bidirectional interface configured to receive the display information from the mixing console and configured to send touch related information to the mixing console.

16. The touch-sensitive display according to claim 13, wherein the at least one support element comprises at least one of a wheel and a rail.

17. A mixing console comprising:
a first display;
an input unit configured to receive at least one audio signal channel;
a plurality of control elements configured to control at least one signal characteristic of the at least one audio signal channel, wherein the first display and the plurality of control elements are located on a first surface area of the mixing console;
at least one connecting element provided on the first surface area; and
a touch-sensitive display that is different from and movable relative to the first display, the touch-sensitive display comprising:
at least one support element which interacts with the at least one connecting element to removably connect the touch-sensitive display to the first surface area, the touch-sensitive display being disposed on a plane parallel to and above the first surface area when connected to the first surface area via the at least one connecting element, the touch-sensitive display being moveable to a plurality of positions, where in each position, the touch-sensitive display covers one or more selected elements including the first display or one or more of the plurality of control elements, the one or more selected elements being inaccessible when covered by the touch-sensitive display,
a communication interface configured for a wireless reception of display information generated by the mixing console based on a detected position of the plurality of positions of the touch-sensitive display on the mixing console, and
a display generating module configured to display the received display information on a screen of the touch-sensitive display.

18. The mixing console of claim 17, wherein the detected position is determined by the mixing console, the mixing console using one or more of a light beam, magnetic induction, satellite-based positioning, and video signals to determine the detected position of the touch-sensitive display.

* * * * *